（12）United States Patent
Novak et al.

(10) Patent No.: US 10,169,910 B2
(45) Date of Patent: Jan. 1, 2019

(54) EFFICIENT RENDERING OF HETEROGENEOUS POLYDISPERSE GRANULAR MEDIA

(71) Applicant: Disney Enterprises, Inc., Burbank, CA (US)

(72) Inventors: Jan Novak, Zurich (CH); Thomas Muller, Zurich (CH); Marios Papas, Zurich (CH); Wojciech Jarosz, Hanover, NH (US)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days.

(21) Appl. No.: 15/427,807

(22) Filed: Feb. 8, 2017

(65) Prior Publication Data
US 2018/0144540 A1    May 24, 2018

Related U.S. Application Data

(60) Provisional application No. 62/424,217, filed on Nov. 18, 2016.

(51) Int. Cl.
*G06T 17/00*       (2006.01)
*G06T 15/10*       (2011.01)
(Continued)

(52) U.S. Cl.
CPC .............. *G06T 15/10* (2013.01); *G06T 15/08* (2013.01); *G06T 15/506* (2013.01); *G06T 2215/16* (2013.01)

(58) Field of Classification Search
CPC ... G06T 2215/16; G06T 15/506; G06T 15/08; G06T 15/10
See application file for complete search history.

(56) References Cited

U.S. PATENT DOCUMENTS

2012/0242679 A1    9/2012   Teng et al.
2014/0267275 A1    9/2014   Jarosz et al.

OTHER PUBLICATIONS

Moon et al., Rendering Discrete Random Media Using Precomputed Scattering Solutions, Dec. 2007, p. 1-12.*
(Continued)

*Primary Examiner* — Robert Craddock
(74) *Attorney, Agent, or Firm* — Patterson + Sheridan, LLP

(57) ABSTRACT

The disclosure provides an approach for rendering heterogeneous polydisperse granular media. In one aspect, a rendering application renders such granular media using a combination of explicit path tracing and accelerated path construction using proxy path tracing, shell tracing, and volumetric path tracing. In proxy path tracing in particular, the rendering application instantiates proxy geometry in the form of a bounding sphere and determines internal scattering in the grain using a precomputed grain scattering distribution function that relates incident and outgoing radiance functions on the bounding sphere. In shell tracing, the rendering application uses shells to aggregate many grain interactions into a single step. The rendering application derives a continuous liquid/volume equivalent to the granular material based on the material's optical properties and selects a precomputed shell transport function (STF) to use from a database by interpolating nearby database entries using radiative transfer equation (RTE) parameters at the shell's center.

21 Claims, 7 Drawing Sheets

(51) Int. Cl.
   *G06T 15/08*   (2011.01)
   *G06T 15/50*   (2011.01)

(56) References Cited

OTHER PUBLICATIONS

Jos Stam, Multiple scattering as a diffusion process, Dec. 1995, ResearchGate, p. 1-12.*
Jensen et al., A Rapid Hierarchical Rendering Technique for Translucent Materials, Dec. 2005, ACM SIGGRAPH, 576-581.*
Jensen et al., A practical model for subsurface light transport, Dec. 2001, ACM, 511-518.*
Skoge et al., Packing hyperspheres in high-dimensional Euclidean spaces, Dec. 2006, The American Physical Society, 1-11.*
Chris Wynn, An Introduction to BRDF-Based Lighting, Dec. 2000, 1-15.*
d'Eon et al., A Quantized-Diffusion Model for Rendering Translucent Materials, Dec. 2011, ACM Transactions on Graphics (TOG), 1-13.*
Soulié et al., Modeling and rendering of heterogeneous granular materials: granite application, Dec. 2007, Wiley Online Library, 66-79.*
Qinghe Li, Light Scattering of Semitransparent Media, May 2008, Georgia Institute of Technology, 1-76.*
Kalle Koutajoki, BSSRDF (Bidirectional Surface Scattering Distribution Function), Dec. 2002, Telecommunications Software and Multimedia Laboratory, 1-14.*
Kimmel et al., Simulating the appearance of sandy landscapes, Apr. 2010, Computers & Graphics, 441-448.*
Meng et al., Multi-Scale Modeling and Rendering of Granular Materials, Dec. 2015, 2015 ACM, 1-13.*
Muller et al., "Efficient Rendering of Heterogeneous Polydisperse Granular Media," ACM Transactions on Graphics (TOG), Proceedings of ACM SIGGRAPH Asia 2016, vol. 35 Issue 6, Nov. 2016, Article No. 168; 14 pages.
Skoge, M., Donev, A., Stillinger, F. H., and Torquato, S. 2006. Packing hyperspheres in high-dimensional Euclidean spaces. Physical Review E 74, 4, 041127.

* cited by examiner

EFFICIENT RENDERING OF HETEROGENEOUS POLYDISPERSE GRANULAR MEDIA

CROSS-REFERENCE TO RELATED APPLICATIONS

This application claims the priority benefit of provisional U.S. patent application entitled "EFFICIENT RENDERING OF HETEROGENEOUS POLYDISPERSE GRANULAR MEDIA," Ser. No. 62/424,217, filed Nov. 18, 2016, which is hereby incorporated herein by reference in its entirety.

BACKGROUND

Field of the Invention

Aspects of the disclosure presented herein relate to computer rendering of three-dimensional (3D) virtual scenes. More specifically, this disclosure presents techniques for rendering heterogeneous polydisperse granular media.

Description of the Related Art

Discrete granular materials frequently found in natural scenes include wet and dry sand, bubbles and foam in liquids, layers of soils, snow, a bowl with spices, and the like. Such granular materials can be made up of massive, dynamic, and heterogeneous collections of discrete grains with different sizes (i.e., polydisperse). Granular materials are characterized by both fine-scale details of individual grains as well as smooth large-scale appearances, which result from the material's properties and the arrangement of individual grains in the material.

The fine-scale details in granular materials result from high-frequency low-order transport of light rays through individual grains, and the high-frequency visual structures for individual grains include geometric detail, sudden changes in color, and glints that typically arise from the first few interactions of the light upon hitting the granular assembly. Characteristics of such high-frequency low-order transport through individual grains are difficult to approximate with an aggregate approximation without eliminating salient details. On the other hand, granular materials may also have smooth large-scale appearances resulting from high-order scattering in which light can scatter hundreds or even thousands of times in the material (e.g., snow or sugar) before exiting the material. Such high-order scattering can be expensive to simulate using brute-force techniques such as path tracing, where each individual interaction is simulated. Unlike the low-order scattering, approximation is needed to make rendering of high-order scattering computationally feasible.

SUMMARY

One aspect of this disclosure provides a computer-implemented method for rendering a granular medium. The method includes computing a plurality of shell transport functions (STFs) over an appearance space of optical parameters, where each STF aggregates a plurality of grain interactions into a single step. The method further includes receiving geometry of a scene which includes the granular medium, determining a continuous volume approximation of the granular medium, the continuous volume approximation having optical properties of the granular medium, and tracing light paths from a camera into the scene. For each of a plurality of traced light paths that intersect the granular medium, the method includes: successively selecting one or more STFs associated with shells which fit in the granular medium based on the optical properties of the continuous volume approximation corresponding to the shells associated with the STFs, and constructing the traced light path using the selected STFs. In addition, the method includes generating at least a rendered image of the scene based on the traced light paths.

Further aspects include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited aspects are attained and can be understood in detail, a more particular description of aspects of this disclosure, briefly summarized above, may be had by reference to the appended drawings. It is to be noted, however, that the appended drawings illustrate only typical aspects and are therefore not to be considered limiting of its scope, for this disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
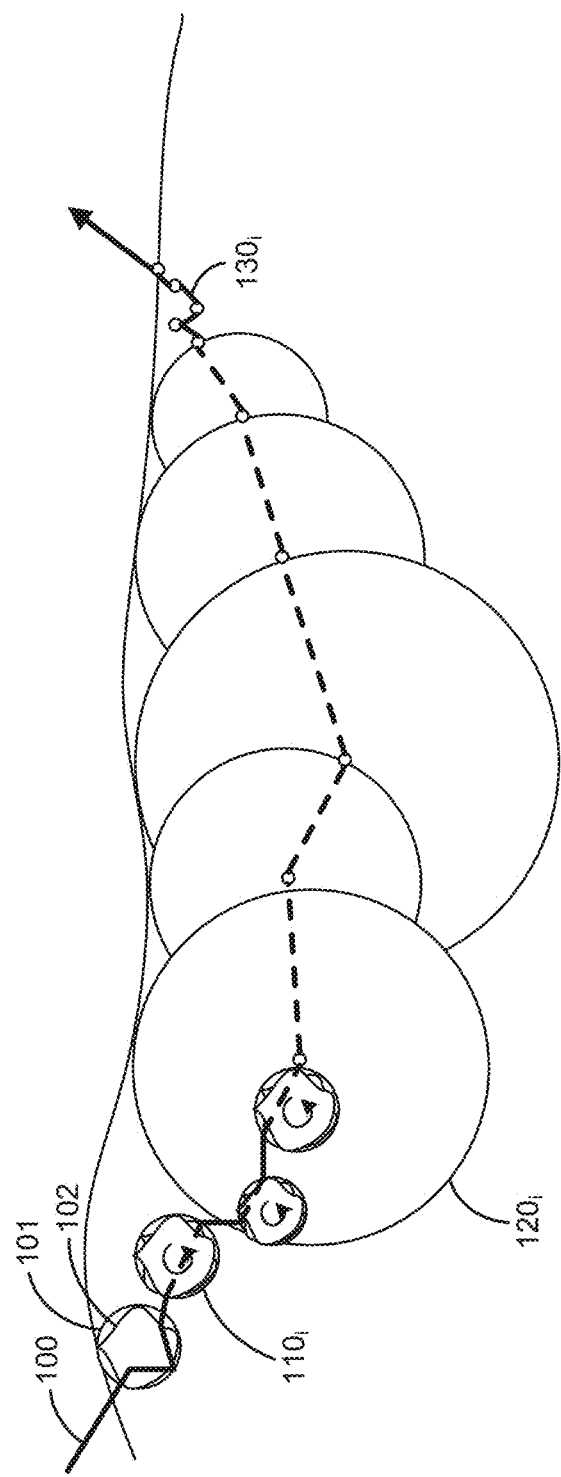
FIG. 1 illustrates an approach for rendering a granular material, according to an aspect of this disclosure.

Aspects of the disclosure presented herein provide an approach for rendering heterogeneous and dynamic polydisperse granular media that can include random mixtures with multiple base materials and spatially varying grain concentrations, pack rates, and sizes. In one aspect, a rendering application is configured to render granular materials (also referred to herein as granular assemblies) using a combination of explicit path tracing, proxy path tracing, shell tracing, and volumetric path tracing. This multi-scale approach aims to trade accuracy for speed whenever possible without sacrificing visual quality, by representing the granular assembly at each scale with necessary details but no extraneous details required for accurately simulating its visual appearance. In explicit path tracing, which is optionally performed for a first grain that a traced light path intersects, the rendering application instantiates a full geometry of the grain and constructs the light path through such a grain. For other grains in the material after the first grain, the rendering application accelerates path construction using proxy path tracing for low-order scattering, shell tracing for high-order scattering, and/or traditional volumetric path tracing. In proxy path tracing, the rendering application instantiates proxy geometry in the form of a tightly bounding sphere (rather than the full geometry of the grain) and determines internal scattering in the grain using a precomputed grain scattering distribution function (GSDF) that relates the incident and outgoing radiance functions on the bounding sphere. In one aspect, the GSDF includes two terms, one for uncollided flux associated with light that hits the bounding sphere but misses the grain itself and one for scattered transport associated with light that hits the grain, and the dimensionality of the GSDF may be reduced to three dimensions by making (1) a random-orientation assumption that all light paths interacting with the bounding sphere each experience the grain under a different random orientation, and (2) a separability assumption that decouples spatial and angular components of the incident light field so that these components may be tabulated separately. In shell tracing, the rendering application uses shell transport functions (STFs) to aggregate many grain interactions (as opposed to interactions within one grain as with the GSDF) into a single step to accelerate the evaluation of high-order transport in granular media with high albedo. In one aspect, the rendering application derives a continuous liquid or volume that is equivalent to the granular material based on optical properties of the granular material and selects a precomputed shell transport function to use from a database of such functions by interpolating nearby STF entries in the database based on radiative transfer equation (RTE) parameters at the center of the shell, or RTE parameters aggregated over a larger region. Doing so permits heterogeneous mixtures such as brown and white sugar, milk and wine, etc. to be rendered based on the optical properties of the mixture. After shell tracing is used, when a smallest available shell no longer fits within the boundary of the granular material, volumetric path tracing may be used to continue constructing the light path until the traced light ray exits the granular material.

In the following, reference is made to aspects of this disclosure. However, it should be understood that this disclosure is not limited to specific described aspects. Instead, any combination of the following features and elements, whether related to different aspects or not, is contemplated to implement and practice aspects of this disclosure. Furthermore, although aspects of this disclosure may achieve advantages over other possible solutions and/or over the prior art, whether or not a particular advantage is achieved by a given aspect is not limiting of this disclosure. Thus, the following aspects, features, configurations, and advantages are merely illustrative and are not considered elements or limitations of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware configuration, an entirely software configuration (including firmware, resident software, micro-code, etc.) or a configuration combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects of this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the application could execute on a computing system in the cloud and render granular materials according to aspects of this disclosure. Doing so allows a user to access this information from any computing system attached to a network connected to the cloud (e.g., the Internet).

Referring now to FIG. 1, an approach for rendering a granular material according to an aspect of this disclosure is shown. A rendering application implements a Monte Carlo path-tracing framework that estimates light transport by averaging multiple randomly constructed light paths starting from a camera. Illustratively, a light ray 100 shot out from the camera (not shown) intersects a bounding sphere 101 of a first grain 102, and the rendering application renders the first grain using explicit path tracing. In explicit path tracing, the rendering application instantiates the full geometry of the grain and constructs the light path through the grain. As such construction of light paths can be computationally expensive (e.g., there may be 10-20 interactions within a 200 k polygon grain requiring ray intersection tests among the 200 k polygon grain), in one configuration, the rendering application only optionally performs explicit path tracing for the first intersected grain of the path, depending on how close the grain is to the camera and how good of an approximation the GSDF is, as discussed in greater detail below. Doing so helps preserve fine-scale structure and high-frequency effects such as glints, while avoiding explicit path tracing where the grain is far away from the camera, and the GSDF approximation is good.

As shown, after leaving the first grain, the path of the light ray 100 continues to a number of other grains $110_i$ that the rendering application replaces with proxy geometry rather than the full grain geometry used in explicit path tracing. This is also referred to herein as proxy path tracing. In one aspect, the proxy geometry is in the form of tightly bounding spheres that replace the individual grains and summarize internal scattering in the grains using precomputed GSDFs, which are discussed in greater detail below. The GSDF approximation relates the incident and outgoing radiance functions on the spherical proxy bounding the grain, i.e., the GSDF takes as input the incident position and direction and gives as output the outgoing position and direction. And the GSDF is "precomputed" by performing a simulation and counting how many photons exit the sphere at different locations and directions. Experience has shown that the low-order scattering approximation of the GSDF retains grain-level details so that proxy path tracing may be used early on (e.g., after explicit path tracing is used for the first intersected grain of the path), significantly reducing the bottleneck that explicit path tracing would otherwise create while postponing the smoothing effects of more higher-order approximations such as a continuous volumetric approximation.

As shown, to quickly simulate long paths through multiple grains, as opposed to interactions within a single grain as with the GSDF, the rendering application replaces grains within the granular material with shells $120_i$. Similar to the GSDFs, the shells are "precomputed" by performing simulations and counting how many photons exit the shells at different locations and directions. Then, during rendering, the rendering application fits the possible biggest shell within the granular material and determines, based on the precomputed shell transfer function, where the light exits from the surface of the shell, and repeats this process with other shells. This allows the rendering application to take big steps, rather than computing interactions with every grain which would be more expensive. In one aspect, the rendering application may find the biggest possible shell by interpolating between a precomputed STF shell that is within the boundary of the granular material and another shell that is just outside the boundary, allowing for the interpolated shell to just touch the boundary of the granular material. This may be needed, as generally not all shell sizes are tabulated (e.g., shell radii may change by a factor of 2 in the tabulation). In another aspect, the rendering application may replace grains with shells whenever a smallest defined shell fits inside the boundary of the granular assembly, and the rendering application may later switch to traditional continuous volumetric path tracing 130 when the smallest shell no longer fits inside the boundary of the granular assembly. The precomputed shells may have a smallest size, as shells are meant to aggregate multiple scattering events, so if the shells are too small in size (e.g., the distance to the material's boundary is less than 1 or 2 mean free paths), then the probability of scattering may be low and use of shells will not produce computational cost savings.

To overcome the need to make scene-dependent precomputations of shells, the rendering application may instead generate a database of shell transport functions over an appearance space (or appearance dictionary) of RTE parameters in a one-time global precomputation. STFs are precomputed for arbitrary homogenous media, allowing acceleration of the rendering using high-order scattering approximations in polydisperse granular mixtures and to render any continuous homogenous volume governed by the RTE. Further, the precomputed STFs can be leveraged with minimal visual error to render granular materials with heterogeneously varying RTE parameters. In one aspect, the rendering application does not directly construct shell transport function on grains, but instead first converts the grains into an equivalent continuous volume based on the RTE parameters. Heterogeneous granular mixtures in particular may be discretized into a voxel grid with voxels that each have RTE parameters of a homogeneous continuous volume. The rendering application then determines STFs to use by interpolating nearby entries in a database of STFs based on RTE parameters at the center of each shell. This can be used both in homogeneous and heterogeneous mixtures. That is, RTE parameters at the center of each shell are used to determine the STFs. In alternative embodiments, RTE parameters may first be aggregated (or summarized) in a larger region, such as an average within the voxel grid (if available), the entire shells, or even the entire volume (which may only work well in approximately homogeneous mixtures). In yet another aspect, shells may not necessarily be centered at the query location, which allows for using shells more often near the surface boundaries of granular media or continuous volumes.

Figure 2:
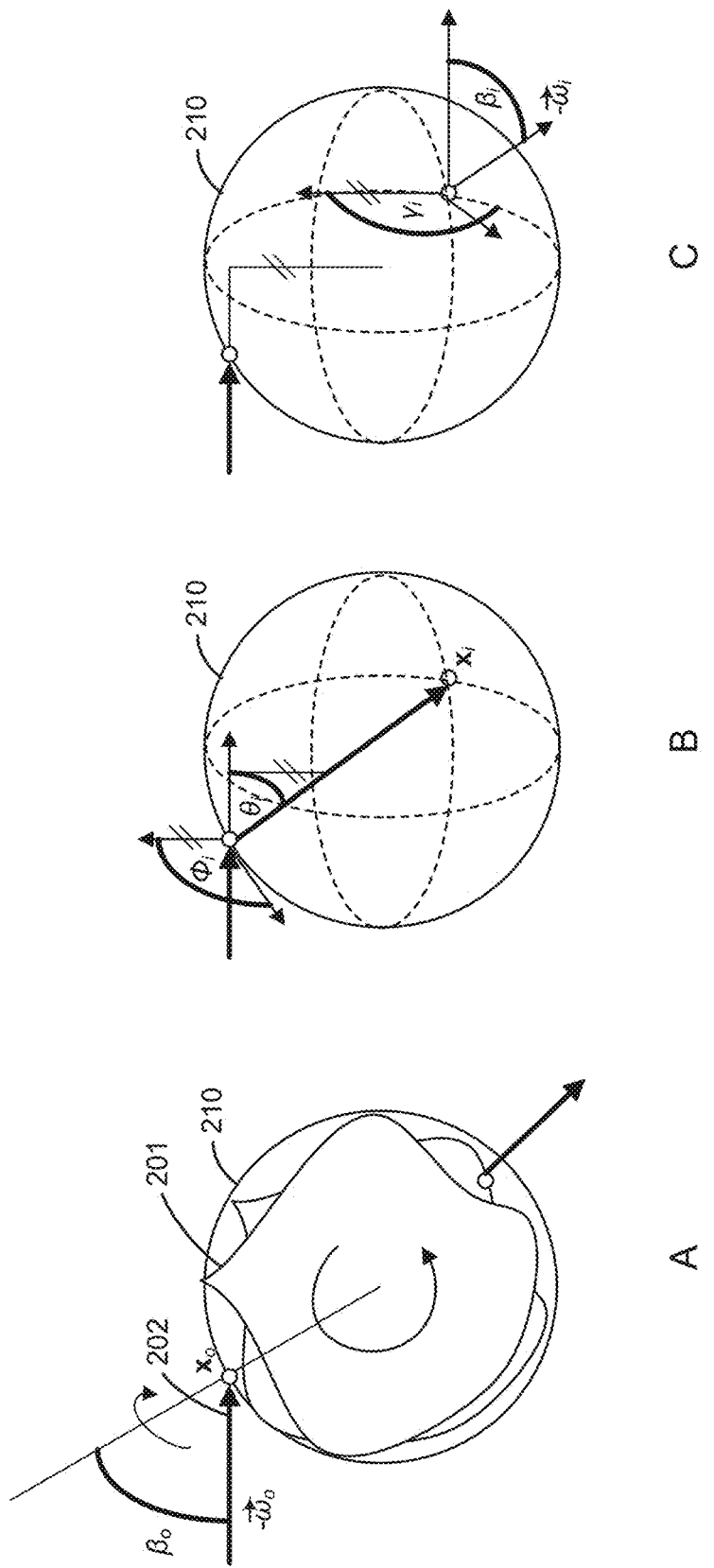
FIG. 2 illustrates dimensionality reduction in a grain scattering distribution function (GSDF), according to an aspect of this disclosure.

FIG. 2 illustrates a grain scattering distribution function with dimensionality reduction, according to an aspect of this disclosure. As shown in panel A, to accelerate low-order transport, the rendering application may replace geometry of a grain 201 with a tight spherical proxy 210 that has largely the same internal light transport as the grain 201 itself, up to the accuracy of a GSDF, denoted by $f_g$, that models the grain's 201 appearance. The GSDF itself is a function that relates incident radiance to differential outgoing radiance on the surface of the proxy sphere 210:

$$f_g(x_i, \vec{\omega}_i, x_o, \vec{\omega}_o) = \frac{dL_o(x_o, \vec{\omega}_o)}{L_i(x_i, \vec{\omega}_i) dx_i d\vec{\omega}_i}, \quad (1)$$

where the subscript i is used to denote incident and the subscript o is used to denote outgoing, respectively.

The GSDF may be defined mathematically as the sum of two terms, one for uncollided flux (i.e., light that hits the proxy sphere 210 but misses the grain itself, a delta component with superscript 0) and one for scattered transport (with superscript +):

$$f_g(x_i, \vec{\omega}_i, x_o, \vec{\omega}_o) = \alpha_g^0(x_o, \vec{\omega}_o)\delta(\vec{\omega}_i + \vec{\omega}_o) + \alpha_g^+(x_o, \vec{\omega}_o) p_g(x_i, \vec{\omega}_i | x_o, \vec{\omega}_o). \quad (2)$$

The probability density function (PDF) $p_g(x_i, \vec{\omega}_i | x_o, \vec{\omega}_o)$ describes the distribution of spatio-angular locations of incident radiance with respect to a given location of the outgoing radiance. In other words, $p_g$ represents the shape of the incident light field contributing to a given coordinate ($x_o$, $\vec{\omega}_o$) in the outgoing light field.

In its monochromatic form, $p_g$ is eight-dimensional (8D), making tabulating the GSDF for arbitrary grains difficult. Panels B and C illustrate a random orientation assumption and a separability assumption, respectively, that reduce the 8D space of $p_g$ to two independent 3D subspaces. That is, the dependencies between angular and spatial components are broken, which essentially assumes that inside the granular material the grains can be blurry and which reduces the GSDF to a 3D function. It should be understood, however, that the GSDF does not have to be exactly 3D and can also have other dimensions, such as two and four dimensions. The random orientation assumption, which assumes that all light paths interacting with a proxy geometry each experience the grain under a different random orientation, tends to blur the rendered image and produce loss of the grain's geometric detail. At the same time, the separability assumption, which decouples the spatial and angular components of the incident light field, may result in further blurring of details seen through the grain. Despite these approximations, the reduced-dimensional GSDF still preserves most of the important directional effects, such as local brightening and darkening due to reflection and refraction that are important to preserve characteristic visual features such as sheen. Further, the random orientation and separability assumptions will not impair visual quality if the spherical proxies using the GSDF are only employed for grains view from a distance or "through" other grains (i.e., the first grain that the light ray intersects is not replaced with proxy geometry but later grains may be).

As discussed, the random-orientation assumption shown in panel B assumes that all light paths interacting with a proxy geometry each experience the grain under a different random orientation. This is akin to spinning the grain infinitely quickly and creates a blurry visual effect. It should be understood that orientation-dependent effects can no longer be resolved under this assumption of random orientation. Mathematically, the random-orientation assumption averages the grain appearance over all sphere surface points $x_o$ and rotations about their respective normal $\vec{n}_o$. As a result, the GSDF no longer depends on $x_o$ and the azimuthal component $\gamma_o$ of $\vec{\omega}_o$, which is shown in panel B. In terms of the outgoing light field, the GSDF varies only in the inclination angle $\beta_o = \cos^{-1}(\vec{\omega}_o \cdot \vec{n}_o)$.

$$f_g(x_i, \vec{\omega}_i, x_o, \vec{\omega}_o) \approx \alpha_g^0(\beta_o)\delta(\vec{\omega}_i + \vec{\omega}_o) + \alpha_g^+(\beta_o) p_g(x_i, \vec{\omega}_i | \beta_o). \quad (3)$$

The distribution of scattered radiance $p_g(x_i, \vec{\omega}_i | \beta_o)$ is now reduced to five dimensions, but this still requires a lot of storage, especially if the scene includes multiple different grain types.

The separability assumption shown in panel C decouples the spatial and angular components of the incident light field so that these components may be tabulated separately. In order to decouple the spatial and angular components, an assumption is made that the distribution of scattered radiance is separable, i.e., $$p_g(x_i, \vec{\omega}_i | \beta_o) \approx p_g^x(x_i | \beta_o) p_g^{\vec{\omega}}(\vec{\omega}_i | \beta_o) \quad (4)$$

Separability is motivated by the fact that grains are relatively small and most incident illumination can be assumed as purely directional, i.e., $L_i(x_i, \vec{\omega}_i) = L_i^{\vec{\omega}}(\vec{\omega}_i)$. Under directional illumination, the reflection equation simplifies, allowing pre-integration over the spatial domain:

$$L_o(x_o, \vec{\omega}_o) = \int_{S_{\vec{\omega}}} \int_{S_x} f_g(x_i, \vec{\omega}_i, x_o, \vec{\omega}_o) L_i(x_i, \vec{\omega}_i) dx_i d\vec{\omega}_i \quad (5)$$

$$= \int_{S_{\vec{\omega}}} L_i^{\vec{\omega}}(\vec{\omega}_i) \int_{S_x} f_g(x_i, \vec{\omega}_i, x_o, \vec{\omega}_o) dx_i d\vec{\omega}_i$$

$$= \int_{S_\omega^{\rightarrow}} L_i^{\vec{\omega}}(\vec{\omega}_i) \hat{f}_g(\vec{\omega}_i, x_o, \vec{\omega}_o) d\vec{\omega}_i,$$

where the distribution of scattered radiance from equation (3) can be represented, without changing the reflection integral, by a product of the directional component $p_g^{\vec{\omega}}(\vec{\omega}_i|\beta_o)$ and a constant. The reflection equation then requires only a 3D precomputation.

Generally, incident illumination is not perfectly directional, as assumed to obtain equation (5). For example, light arriving from nearby grains may not be directional. In one aspect, the lighting is not assumed to be perfectly directional, and instead the separability assumption is used only to replace the constant discussed above by a 3D spatial distribution $p_g^x(x_i|\beta_o)$, as shown in equation (4). Doing so preserves some of the dependence of the GSDF on the spatial component of the incident light field without increasing the dimensionality of the tabulation.

It should be understood that the original 8D GSDF may theoretically be reduced to an arbitrarily low dimensional subset. The 3D choice of dimensions discussed herein is motivated by the intuitive physical interpretation and by relative importance of individual visual features. If, for example, the incident dimensions were neglected and the outgoing ones were decoupled, the geometric detail of the grains would be preserved but they would appear lit by a constant (averaged) environmental map. The 3D choice of dimensions herein instead maintains directional lighting effects rather than preserving fine-scale geometric detail. An additional benefit of choosing the subset empirically, in contrast to subspaces obtained by SVD or PCA, is that the visual impact can be understood, allowing easy design of switching criteria for using the GSDF.

Figure 3:
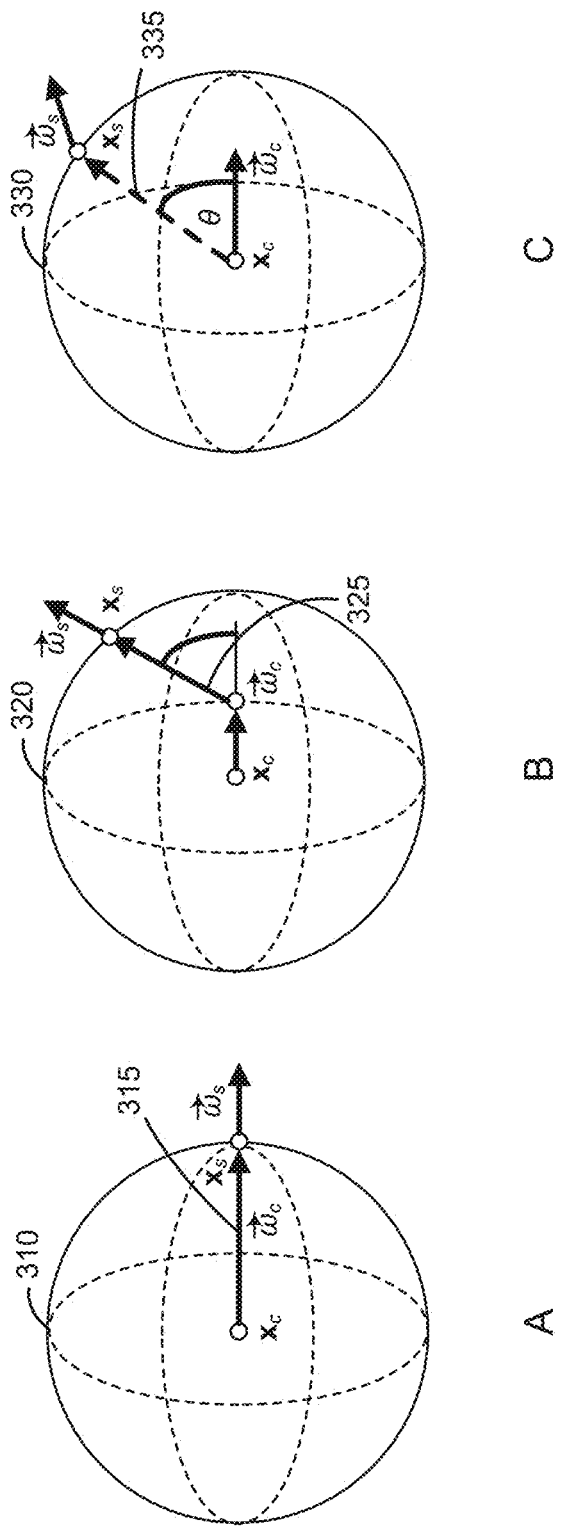
FIG. 3 illustrates parameterizations of a shell transport function, according to an aspect of this disclosure.

FIG. 3 illustrates shell transport function parameterizations, according to an aspect of this disclosure. As shown in panels A-C, shells 310, 320, and 330 are used to summarize interactions among many grains into one step to accelerate the evaluation of high-order transport in granular media with high albedo. In one aspect, the rendering application first approximates the granular material assembly as a continuous medium. That is, rather than building shells using the grains of the granular medium itself, the rendering application derives from the granular material an equivalent mixture of a liquid or volume that has on average the optical properties of the granular material. Then, during path tracing, the rendering application retrieves an appropriate shell transport function to use based on an interpolation of nearby entries in an STF database using RTE parameters at the center of a shell, or, alternatively, an aggregation of RTE parameters such as an average within a voxel grid, the entire shell, or the entire volume. As discussed, this approach works for both homogeneous and heterogeneous mixtures. In addition, at each bounce, the rendering application may fit the biggest possible shell by interpolating between a precomputed shell that is within the boundary of the granular material and another shell that is just outside the boundary, allowing for the interpolated shell to just touch the boundary of the granular material. The shell transport function itself may be split (i.e., parameterized) into non-scattering paths such as path 315 shown in panel A; single scattering paths such as path 325 shown in panel B; and multiple scattering paths, such as path 335 shown in a ghosted line in panel C, which summarizes all scatterings that occur within the shell 330.

The shell transport function generally aggregates light transport in a spherical region containing many grains. In contrast to the GSDF, which relates incident and outgoing light fields, the STF captures only the outgoing light field due to an infinitesimal pencil beam emitter at the center of the shell. In the monochromatic case, the STF is ten-dimensional and parameterized by the location $x_c$ and direction $\vec{\omega}_c$ of the emitter, and by the position $x_s$ and the direction $\vec{\omega}_s$ on the surface of the shell, as shown in FIG. 3. Given a photon originating from this pencil beam emitter, the STF quantifies the probability of the photon first exiting the shell at $x_s$ in direction $\vec{\omega}_s$:

$$f_s(x_c, \vec{\omega}_c, x_s, \vec{\omega}_s) = \alpha_s p_s(x_s, \vec{\omega}_s | x_c, \vec{\omega}_c), \quad (6)$$

where $\alpha_s$ and $p_s(x_s, \vec{\omega}_s | x_c, \vec{\omega}_c)$ are the fraction and spatio-angular distribution of light that reached the surface of the shell, respectively. $\alpha_s$ is also referred to herein as the shell albedo. By assuming a homogeneous assembly of grains with optical properties invariant with respect to position or direction, the STF can be made agnostic to the position and orientation of the emitter and rotationally symmetric about $\vec{\omega}_c$. As a result, the shell transport function reduces to four dimensions and may be parameterized by the radius $r = \|x_s - x_c\|$, elevation angle of the surface point $\theta = \cos^{-1}(\vec{\omega}_c \cdot \vec{n}_{x_s})$, and outgoing direction $\vec{\omega}_s$.

Figure 4:
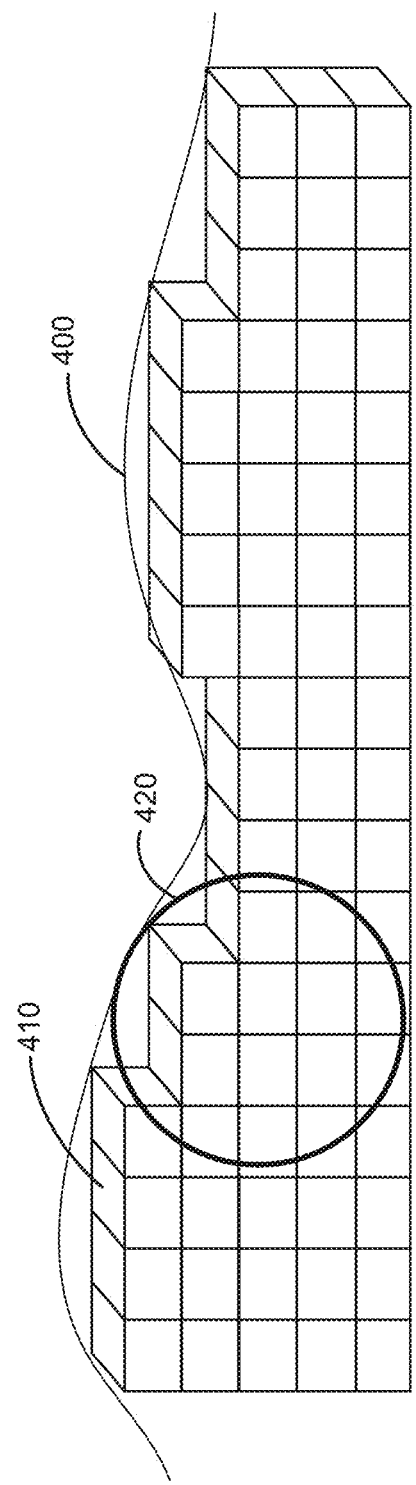
FIG. 4 illustrates a continuous volume approximation of a granular material, according to an aspect of this disclosure.

In order to efficiently support mixtures with spatially varying appearance, as opposed to purely homogeneous mixtures, the rendering application tabulates a general function once that can be used for arbitrary sets of grains, including those not known at the time of precomputation. As discussed, the rendering application may approximate the granular material assembly as a continuous medium having certain optical properties. That is, the rendering application essentially determines what properties a volume would need to have the same appearance as the granular media assembly. In one aspect, the rendering application may use RTE parameters $(\sigma_t, \alpha, f_p)$ of a continuous volume approximation as the basis for classifying a mixture of grains. Here, RTE parameters may be derived, using known equations and the GSDF, pack rate, and other statistics, for granular material assemblies that are polydisperse, i.e., mixtures with differently sized grains, where all grains, except for a scaling factor, are identical. It is assumed that the density of the grain's interior medium scales with the size of the grain, as this simplifies the derivation and allows for artist-friendly, scale-independent modeling in normalized object space, as well as enabling use of a single GSDF for all sizes of the grain. In addition, heterogeneous mixtures may be handled by discretizing the RTE parameters into a voxel grid, with each voxel being associated with appropriate RTE parameters and the RTE parameters of the voxels enclosed by a shell being used to select the shell transport function to use. An example of such a continuous volume approximation of a granular material 400 with RTE parameters discretized into a voxel grid 410 is shown in FIG. 4.

In homogeneous polydisperse mixtures of grains in particular, the scattering distributions due to randomly oriented grains may be approximated by one-dimensional functions of $(\vec{\omega}_i \cdot \vec{\omega}_o)$. The rendering application may extract the phase function $f_p$ RTE parameter from the directional component of the GSDF $p_g^{\vec{\omega}(\vec{\omega}_i|\beta_o)}$ by averaging over the azimuthal dimension of $\vec{\omega}_i$. As $p_g$ is normalized, the 1D average is already a valid PDF. Further, the rendering application may compute the albedo RTE parameter of the continuous approximation $\alpha_v$ from the albedo of the scattered component of the GSDF by integrating area-weighted $\alpha_g^+(\beta_o)$ over $\langle 0, \pi/2 \rangle$. In addition, the rendering application may determine the extinction coefficient RTE parameter $\sigma_t$ of the medium as the reciprocal of the mean free path $\lambda_t$ of the granular mixture:

$$\lambda_t = \lambda_c + \alpha_v \lambda_v, \quad (7)$$

where $\lambda_c$ corresponds to the mean outer chord length of the original mixture (i.e., the length of an inter-grain path segment, analogous to free path in continuous media). This can be computed with the following closed-form solution to an infinite series:

$$\lambda_c = (\lambda_s + \lambda_\delta)\frac{1-c}{c} + \lambda_s, \quad (8)$$

where c is the conditional probability that a random ray passing through a grain's bounding sphere will hit the grain and $\lambda_s$ is the mean outer chord length obtained by replacing each grain with an opaque version of its bounding sphere. $\lambda_s$ itself may be computed with an approximation for polydisperse mixtures:

$$\lambda_s^p = \frac{4\langle R^3 \rangle}{3\langle R^2 \rangle}\frac{1-f}{f}, \quad (9)$$

where $\langle \cdot \rangle$ denotes the expected value along a ray passing through the corresponding infinite polydisperse mixture. The ratio of expected values in equation (9) may be interpreted as the radius of the "average" sphere that the ray experiences. In one aspect, the mean spatial offset of an unscattered ray $\lambda_\delta$ and the length of the mean teleportation distance $\lambda_v$ may be precomputed by shooting many rays against the grain. It should be understood that both lengths linearly depend on the grain. For polydisperse mixtures, the lengths may be computed on grains scaled to have unit-radius bounding spheres and then scaled by $\langle R^3 \rangle / \langle R^2 \rangle$, i.e., the radius of the "average" sphere.

In heterogeneous mixtures, to support varying packing rates and grain concentrations, the rendering application may allow the RTE parameters to change spatially and discretize them into the voxel grid 410, as discussed above. The goal is to derive a heterogeneous continuous approximation without making assumptions about how the discrete assembly was created, thereby supporting procedural, dynamically simulated, and fully explicit modeling approaches. In one aspect, to construct the heterogeneous medium, the rendering application first creates the voxel grid 410 that will hold the RTE parameters of the continuous approximation. For example, the rendering application may use 2× the diameter of the largest grain as the voxel size. As the voxels are relatively small, it may be assumed that the granular assembly is homogeneous within each voxel, which allows the local RTE parameters to be derived as discussed above. To collect reliable statistics of grains in a given voxel v, the rendering application enumerates all grains in a small neighborhood of, e.g., 3×3×3 voxels centered around v and computes the main GSDF, the mean squared and cubed radii $\rangle R^2 \langle$ and $\rangle R^3 \langle$ of the bounding spheres, respectively, and their packing rate. This provides the necessary information to derive the (homogeneous) RTE parameters for the voxel, discussed above. When the grains' types are not correlated with their sizes, size-agnostic averaging of GSDFs is optimal. However, cross-section weighted averaging is more appropriate in the general case in order to capture the correlation between a grain's size and its contribution to the appearance of the volume.

Returning to FIG. 3, the voxel-grid representation is used to perform path tracing that is accelerated using shell transport functions. As discussed, during path tracing, the rendering application retrieves an appropriate shell transport function to use based an interpolation of nearby STF database entries using RTE parameters at the center of the shell (e.g., shell 420 in FIG. 4), or using an aggregation of RTE parameters in a larger region such as an average within a voxel grid, the entire shell, or the entire volume. In another aspect, shells may not necessarily be centered at the query location. The RTE parameters $(\sigma_t, \alpha, f_p)$ are used as the basis for classifying the mixture of grains and selecting the shell transport function to use. This enables abstraction of the actual grain geometry and allows a focus only on the RTE parameters relevant to high-order transport. The extinction coefficient of the medium may be implicitly accounted for by expressing the shell's radius r in units of mean free paths $1/\sigma_t$. Furthermore, the phase function $f_p$ may be reduced to a single parameter, the mean cosine g of scattered light in the Henyey-Greenstein phase function. The appearance of any homogeneous grain assembly can be classified using $(\alpha, g)$. Adding these to the 4D STF-six dimensions in total—is, however, impractical to tabulate.

In one aspect, the directional distribution of flux exiting the shell is considered, and a decomposition is made that allows reducing the tabulation to only four dimensions. In such a case, the STF database may be defined as a sum of uncollided, single-scattered, and multi-scattered components:

$$f_s(x_c, \vec{\omega}_c, x_s, \vec{\omega}_s, \alpha, g) = \alpha_s^0(r)\delta(\vec{\omega}_c - \vec{\omega}_s) + \alpha_s^1(\alpha,g,r)p_2^1(x_s,\vec{\omega}_s|g,r) + \alpha_s^m(\alpha,g,r)p_s^m(x_s, \vec{\omega}_s|\alpha,g,r), \quad (10)$$

where the subscripts 0, 1, m mark quantities of the respective components, $p_s^1(x_s, \vec{\omega}_s, r)$ is the distribution of single-scattered photons. The joint PDFs $p_s^m(x_s, \vec{\omega}_s | \alpha, g, r)$ is defined as the product of positional and directional components:

$$p_s^m(x_s, \vec{\omega}_s|\alpha,g,r) = p_s^{m,x}(\theta|\alpha,g,r)p_s^{m,\vec{\omega}}(\vec{\omega}_s|\alpha,g,r,\theta). \quad (11)$$

Separating out the uncollided and single-scattered flux, and integrating them on the fly using Monte Carlo estimators, results in a significantly smoother function to be tabulated. In addition, the multi-scattering lobe $p_s^{m,\omega}$ may be approximated by a cosine-weighted hemispherical distribution oriented about normal $\vec{n}_{x_s}$. This reduces the tabulation of $p_s^m$ down to four dimensions $(\alpha,g,r,\theta)$. That is, the single scattering and uncollided flux that are typically high frequency require higher resolution, so they may be handled using traditional Monte Carlo ray tracing. In contrast, multi-scattering transport may be tabulated (with the angle $\theta$ of the multi-scattering and the size of the radius of the shell r being stored), along with the albedo a and the phase function represented by g, which reduces the tabulation to the four dimensions $(\alpha,g,r,\theta)$. Experience has shown that only tabulating these four dimensions reduces the size of the STF database significantly.

Figure 5:
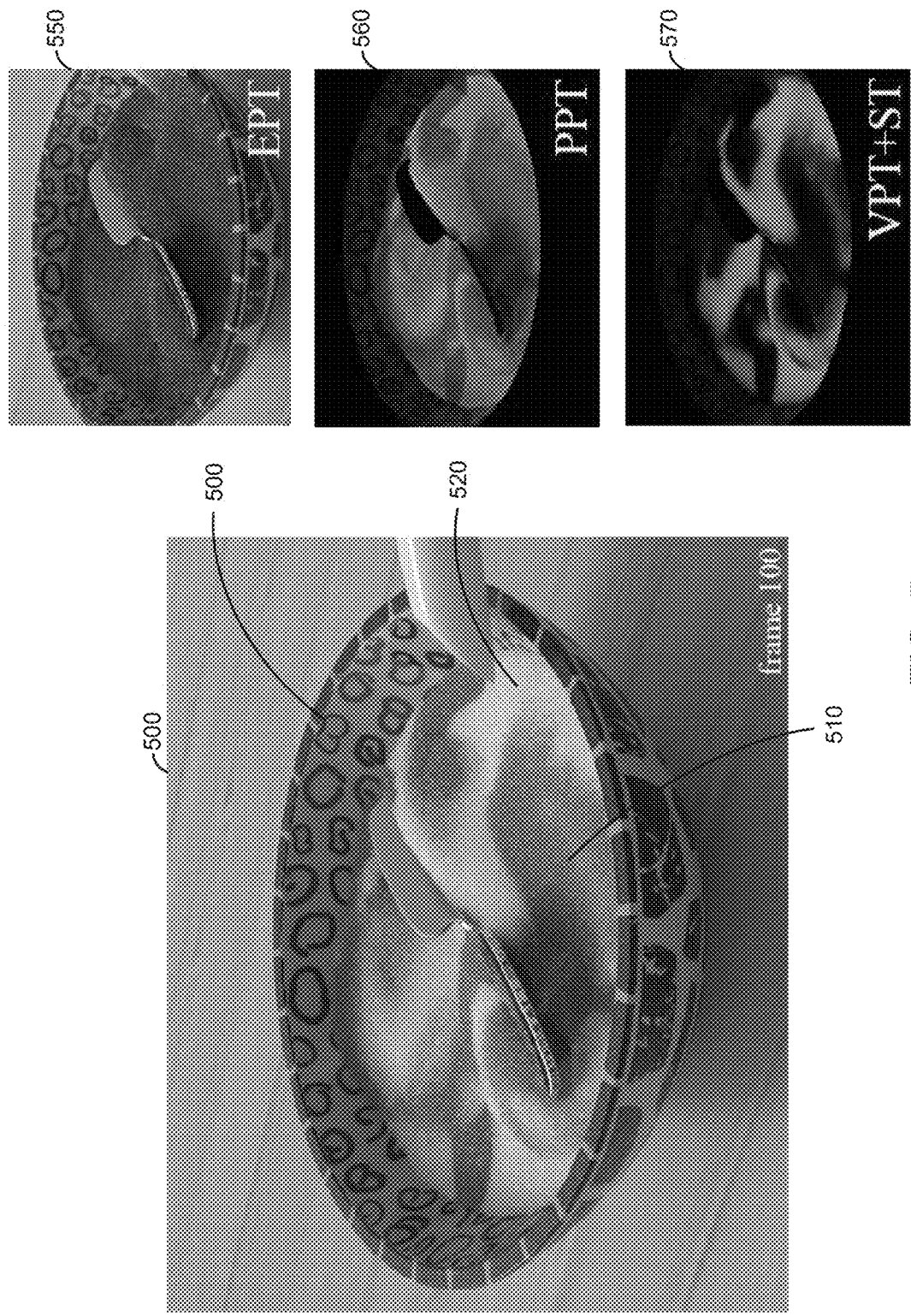
FIG. 5 illustrates an example of a rendered image and components of the rendering, according to an aspect of this disclosure.

FIG. 5 illustrates an example of a rendered image and components of the rendering, according to an aspect of this disclosure. As shown, the rendered image 500 depicts a bowl 505 with a heterogeneous mixture of brown sugar 510 and white sugar 520. Illustratively, the rendering application renders the image 500 using a combination of explicit path tracing, proxy path tracing, shell tracing, and volumetric path tracing. Explicit path tracing is (optionally) used to render the first grain that a traced light path intersects, and the explicit path tracing simulates most of the high-frequency detail, such as glints, as shown in the image 550 depicting the explicit path tracing result. Proxy path tracing accelerates the simulation using precomputed GSDF(s) which aggregate light scattering within individual grains, with the grain geometry being replaced with a spherical proxy. The result of such proxy path tracing is shown in image 560. Shell tracing advances the light through the medium in large steps using a precomputed aggregation of scattering events, i.e., the shell transport functions, within large spherical regions including multiple grains. In one aspect, the rendering application may determine a continuous volume approximation of the granular material having certain RTE parameters, and use the parameter values to select shell transport functions to use. Finally, volumetric path tracing is used when the smallest precomputed STF shell no longer fits within the granular material. The result of shell tracing and volumetric path tracing is shown in image 570. Together, the explicit path tracing, proxy path tracing, shell tracing, and volumetric path tracing components add up to the full light transport depicted in the final rendered image 500.

Figure 6:
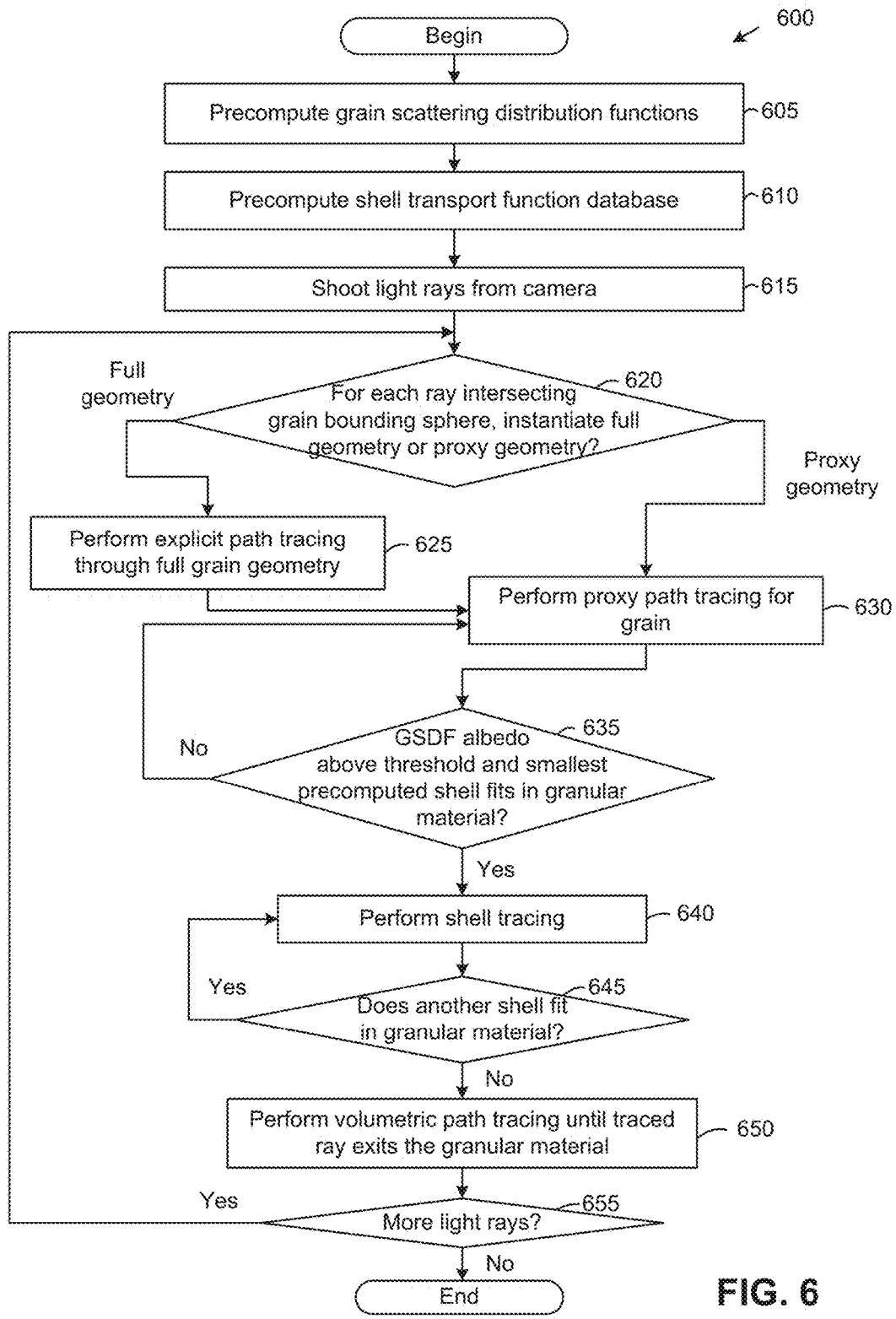
FIG. 6 illustrates a method of rendering a granular material, according to an aspect of this disclosure.

FIG. 6 illustrates a method 600 of rendering a granular material, according to an aspect of this disclosure. As shown, the method 600 begins at step 605, where a rendering application precomputes grain scattering distribution functions. When parsing a scene, the rendering application takes each grain type and precomputes the 3D GSDF discussed above for the grain type. In a particular configuration, the rendering application may discretize the GSDF's individual components according to Table 2 and populate a table of GSDFs in the following manner. The rendering application shoots a light path from a randomly chosen direction toward the grain, choosing the origin of the path such that the grain's bounding sphere's cross section is hit with a uniform probability density. The rendering application then resolves all interactions with the grain and records the exit location of the path in two 3D RGB histograms: a spatial histogram parameterized by $(\beta_o, x_i)$ and a directional histogram parameterized by $(\beta_o, \vec{\omega}_i)$. After tracing enough paths, each effectively experiencing the grain under a different random orientation, the rendering application converts the histograms into a set of piece-wise constant conditional PDFs $p_g^x(x_i|\beta_o)$ and $p_g^\omega(\vec{\omega}_i|\beta_o)$ by normalized 2D $\beta_o$-slices of the respective histograms, facilitating trivial importance sampling of the GSDF. The rendering application may also keep track of the relative fractions of energy that exited the proxy sphere after zero and after at least one scattering event to obtain $\alpha_g^0(\beta_o)$ and $\alpha_g^+(\beta_o)$, respectively.

TABLE 2

| Dimension | Domain | Spacing | Resolution |
|---|---|---|---|
| $\beta_o$ | $\in [0, \pi/2]$ | linear in cos $\beta_o$ | 50 bins |
| $\beta_i$ | $\in [0, \pi]$ | linear in cos $\beta_i$ | 360 bins |
| $\gamma_i$ | $\in [0, 2\pi]$ | linear in $\gamma_i$ | 180 bins |
| $\theta_i$ | $\in [0, \pi]$ | linear in cos $\theta_i$ | 180 bins |
| $\phi_i$ | $\in [0, 2\pi]$ | linear in $\phi_i$ | 180 bins |

TABLE 2-continued

| Dimension | Domain | Spacing | Resolution |
|---|---|---|---|

At step 610, the rendering application precomputes a shell transport function database. As discussed, a one-time global computation is performed to obtain the database of STFs over an appearance space (or appearance dictionary) of RTE parameters in arbitrary homogenous media, such that the rendering application can accelerate high-order scattering approximations in polydisperse granular mixtures based on the RTE parameters of a voxel grid representing the granular material. In one aspect, single scattering and uncollided flux that are typically high frequency may be handled using traditional Monte Carlo ray tracing, while multi-scattering transport in the shells may be tabulated (with the angle $\theta$ of the multi-scattering and the size of the radius of the shell r being stored), along with the albedo $\alpha$ and the phase function represented by g, which reduces the tabulation to the four dimensions $(\alpha, g, r, \theta)$. In a particular configuration, to construct the STF database $p_s^m$, the rendering application discretizes its individual components according to Table 3 below and populates the database in the following manner.

TABLE 3

| Dimension | Domain | Spacing | Resolution |
|---|---|---|---|
| g | $\in [-1, 1]$ | linear in g | 200 bins |
| $\alpha$ | $\in [0, 0.999]$ | linear in $\log\left(\frac{1}{1-\alpha}\right)$ | 1000 bins |
| r | $\in [1, 256]$ ($\alpha_s > 0.5$) | linear in log(r) | ≤9 bins |
| $\theta$ | $\in [0, \pi]$ | linear in cos$\theta$ | 45 bins |

For each value of the mean cosine $g_j$, the rendering application creates an infinite homogeneous volume with the corresponding HG phase function and $\alpha=1$, with the goal being to precompute all values of $\alpha$ at once. In such a case, the rendering application traces N photons and first tabulates the shell with the smallest radius. The radius for the k-th shell is then computed as $r_k = 2^{k-1}$ mean free paths, starting with k=1. For each spatial bin $\theta_l$, the rendering application constructs a histogram $H_l$, where the b-th bin in the histogram counts photons exiting the shell after exactly b bounces. This allows the multi-scattered flux for any value of the discretized albedo $\alpha_i$ to be computed as:

$$p_s^{m,x}(\theta_k | \alpha_i, g_j, r_k) = \frac{1}{N} \sum_{b=2}^{|H_l|} \alpha_i^b H_l[b]. \quad (12)$$

The rendering application may also use the histogram to compute the albedos of the individual components as:

$$\alpha_s^0(r_k) = \exp(-r_k) \quad (13)$$

$$\alpha_s^1(\alpha_i, g_j, r_k) = \frac{1}{N} \sum_l \alpha_i H_l[1] \quad (14)$$

$$\alpha_s^m(\alpha_i, g_j, r_k) = \frac{1}{N} \sum_l \sum_{b=2}^{|H_l|} \alpha_i^b H_l[b]. \quad (15)$$

Equations (12)-(15) express the tabulated terms for a shell of radius $r_k$ mean free paths. In one aspect, smaller shells may be used to accelerate tracing of paths for larger shells to significantly reduce the number of traced path segments, cutting down on the precomputation of the entire STF database.

At step 615, the rendering application shoots light paths from a camera. For each ray that intersects a bounding sphere of the granular material, the rendering application determines, at step 620, whether to instantiate a full geometry of the grain or a proxy geometry in lieu of the full geometry. In one aspect, the rendering application may replace full geometry with proxy spherical geometry for distant grains and grains for which the GSDF provides a good approximation. Mathematically, this criteria may, in one configuration, be expressed as:

$$\text{instantiate} \begin{cases} \text{explicit grain} & \text{if } \Omega_g > 4\Omega_{px} \text{ or } E_{f_g} > 0.1 \\ \text{proxy} & \text{otherwise} \end{cases}, \quad (16)$$

where $\Omega_g$ is the solid angle occupied by the grain's bounding sphere when viewed from the camera, $\Omega_{px}$ is approximately the solid angle of the corresponding pixel, and the error of the GSDF $E_{f_g}$ is the maximum approximation error $$E_{f_g} = \max_{\vec{\omega}_i, \vec{\omega}_o} e_{f_g}(\vec{\omega}_i, \vec{\omega}_o). \quad (17)$$

Here, $e_{f_g}$ is the GSDF's approximation error in the directional domain, i.e., when averaging grain appearances over all incident and outgoing path locations $x_i$ and $x_o$ $$e_{f_g}(\vec{\omega}_i, \vec{\omega}_o) = |f_g(\vec{\omega}_i, \vec{\omega}_o) - f_g(\beta_i)|, \quad (18)$$

so $E_{f_g}$ represents the worse-case appearance difference between a grain and its 3D GSDF. For a given pair of incident and outgoing directions, the error amounts to the absolute difference between the ground-truth GSDF averaged over $x_i$ and $x_o$, $f_g(\vec{\omega}_i, \vec{\omega}_o)$, and the GSDF with the random-orientation assumption and also averaged spatially $f_g(\beta_i)$. Note that spatial averaging collapses the approximate GSDF into a rotationally symmetric phase function depending only on a single one-dimensional parameter $\beta_i = \cos^{-1}(-\vec{\omega}_i \cdot \vec{f}_o)$.

If the rendering application determines at step 620 to instantiate the full grain geometry, then, at step 625, the rendering application performs the traditional explicit path tracing through the full grain geometry that is instantiated. After performing explicit path tracing for the first grain, or if the rendering application determines at step 620 that the proxy geometry should be instantiated, then the rendering application performs proxy path tracing for the (next) grain at step 630. As discussed, in proxy path tracing, geometry of each grain is replaced by a proxy sphere, and the internal scattering in the grains is approximated using GSDFs precomputed at step 605. In one aspect, the rendering application may first probabilistically decide whether to sample uncollided or scattered transport proportional to $p_g^x(x_i|\beta_o)$ and $p_g^{\omega(\omega)}(\omega_i|\beta_o)$ to determine the location and direction for continuing the path. In such a case, the rendering application may additionally generate a shadow connection by importance sampling light sources from the exit location and combining the light-source and directional GSDF sampling via multiple importance sampling. That is, once a proxy sphere is intersected, the rendering application evaluates direct illumination and samples the next ray and uses multiple importance sampling to combine the two contributions.

At step 635, the rendering application determines whether the GSDF albedo is above a threshold and a smallest precomputed STF shell fits in the granular material. These are the conditions for switching from the discrete, proxy representation to a continuous volume approximation using shell transport functions. As discussed, STF shells may be precomputed up to a smallest size, as shells are meant to aggregate multiple scattering events, so shells that are too small (e.g., the distance to the material's boundary is less than 1 or 2 mean free paths), with the probability of scattering too low, may not produce computational cost savings. In a particular configuration, the rendering application may check after every bounce of the path whether the precomputed STF shells fit and accelerate path construction using STFs whenever the GSDF albedo is above 0.9 and the path is deeper than 1 mean free path inside the granular material, with 1 mean free path being the smallest precomputed shells.

If the rendering application determines that the GSDF albedo is not above the threshold or the smallest precomputed STF shell does not fit at step 635, then the method 600 returns to step 630, where the rendering application performs proxy path tracing for another bounce. On the other hand, if the rendering application determines that the GSDF albedo is above the threshold and the smallest precomputed STF shell fits at step 635, then at step 640, the rendering application performs shell tracing in which the STF database precomputed across the appearance space of RTE parameters at step 610 is used to select STFs to use by interpolating nearby STF database entries using RTE parameters at the center of each shell, or using an aggregation of RTE parameters such as an average within a voxel grid, the entire shell, or the entire volume. In yet another aspect, shells may not all be centered at the query location. As discussed, during shell tracing itself, the rendering application analytically derives equivalent continuous volume RTE parameters for the granular material and then, by using interpolation on the STF database, determines the STF that corresponds to the location in the granular material based on the RTE parameters. The rendering application then samples this STF to obtain a position and a direction for the light ray, with the sampling step summarizing potentially many grain interactions in highly scattering media. At the sampled location, the rendering application further evaluates direct illumination and continues shell tracing, if appropriate. The rendering application may also use multiple importance sampling for variance reduction.

In the simpler case of homogeneous mixtures, the rendering application looks up the STF with the best-matching g and α parameters from the STF database, assuming the light path is to be continued from vertex $x_c$ in direction $\vec{\omega}_c$. Then, the rendering application uses the largest radial component of such an STF that fits inside the mesh of the granular material to advance the light path. Next, the rendering application randomly picks one of the components proportional to their respective $\alpha_s$. If the uncollided component is chosen, then the rendering application continues the path forward in r mean free path units, i.e., $x_s = x_c + r\vec{\omega}_r$, $\vec{\omega}_s = \vec{\omega}_c$. For single scattering, the rendering application samples the free-flight distance to one scattering location x, generates direction $\vec{\omega}_s$ by phase function importance sampling, and sets $x_s$ to the shell surface point seen from x in $\vec{\omega}_s$. To sample multiple scattering, the rendering application samples $x_s$ on the surface of the shell according to the tabulated distribution $p_s^{m,x}$ and chooses $\vec{\omega}$ by cosine-weighted sampling of the hemisphere at $x_s$.

In the case of heterogeneous mixtures, the rendering application chooses the STF in the same way as in homogeneous mixtures discussed above, except that the rendering application relies on the RTE parameters of the voxels in the neighborhood of the current path vertex. As discussed, the rendering application does not operate on the granular assembly by constructing shell transport function on grains. Instead, the rendering application first converts the grains into the continuous medium, with inhomogeneous granular mixtures being discretized into a voxel grid with voxels that each have RTE parameters of a homogeneous continuous volume, and the rendering application then determines STFs to use based on the RTE parameters in a neighborhood of the shell. In one configuration, greedy shell selection may be used, in which the heterogeneity of the material is ignored and the rendering application selects a shell respecting only the boundary of the overall granular assembly (as in homogeneous mixtures). In an alternative configuration, the rendering application may use more conservative shell selection in which the shell size is limited to the locally homogeneous region. That is, the shell size respects the heterogeneity, as the rendering application does not grow shells past boundaries where there are large variations in material properties but instead grows the shells to touch such interfaces (e.g., the boundary between white and brown sugar). In such conservative selection of STF sizes, the amount of variation $\sigma_t$ and $\alpha$ within the volume of the selected STF may be limited. More specifically, the rendering application may choose an upper bound on the STF radius r by enforcing the following constraints on all locations x inside the STF:

$$\left|\log_2\left(\frac{\sigma_t(x)}{\sigma_t(x_c)}\right)\right| < 0.5 \quad (19)$$

$$\left|\log_2\left(\frac{1-\alpha(x)+\epsilon}{1-\alpha(x_c)+\epsilon}\right)\right| < 0.5. \quad (20)$$

Constraint (19) is motivated by the exponential nature of transmittance $\tau(\sigma_t, t) = \sigma_t e_t^{-\sigma_t t}$. Constraint (20) is based on the observation that the diffuse reflectance of a continuous volume is roughly proportional to log $$\left(\frac{1}{1-\alpha}\right)$$

up to values very close to 1, at which point the relation becomes sublinear. In a particular configuration, $\epsilon$ may be set to $\epsilon=0.001$ to avoid the singularity at $\alpha=1$ and to capture the sublinear aspect.

STFs may introduce complications in multi-channel rendering. As STFs are precomputed at discrete radii, which may be multiples of the mean-free-path of the medium, the sizes of shells in each channel do not match up if the extinction of the medium varies across channels. This means that STFs cannot trivially be evaluated across channels. In one configuration, the rendering application solves this problem by approximating STFs of arbitrary radii by linearly interpolating precomputed STFs with neighboring radii in logarithmic space. For example, if $f_s(r_1)$ and $f_s(r_2)$ were precomputed and $r_1 \leq r < r_2$, then $$f_s(r) \approx (1-w_r)f_s(r_1) + w_r f_s(r_2) \quad (21)$$

$$w_r = \frac{\log(r)-\log(r_1)}{\log(r_2)-\log(r_1)}. \quad (22)$$

The usage of the logarithmic space is motivated by the exponential nature of continuous media and by empirical experiments.

After each shell bounce, the rendering application determines at step 645 if another STF shell fits in the granular material, similar to step 635. If the rendering application determines that another shell fits, then the method 600 returns to step 640, where the rendering application performs shell tracing again for another bounce. If on the other hand the rendering application determines that another shell does not fit, then the method 600 continues to step 650, where the rendering application performs traditional volumetric path tracing until the traced ray exits the granular material. It should be understood that if the smallest STF shell fits again after the volumetric path tracing, then shell tracing may be performed once again. In addition, if there are additional rays being traced at step 655, then the method 600 will return to step 620, where the rendering application again instantiates either full or proxy geometry when a ray first intersects the bounding sphere of a grain of the granular material.

Figure 7:
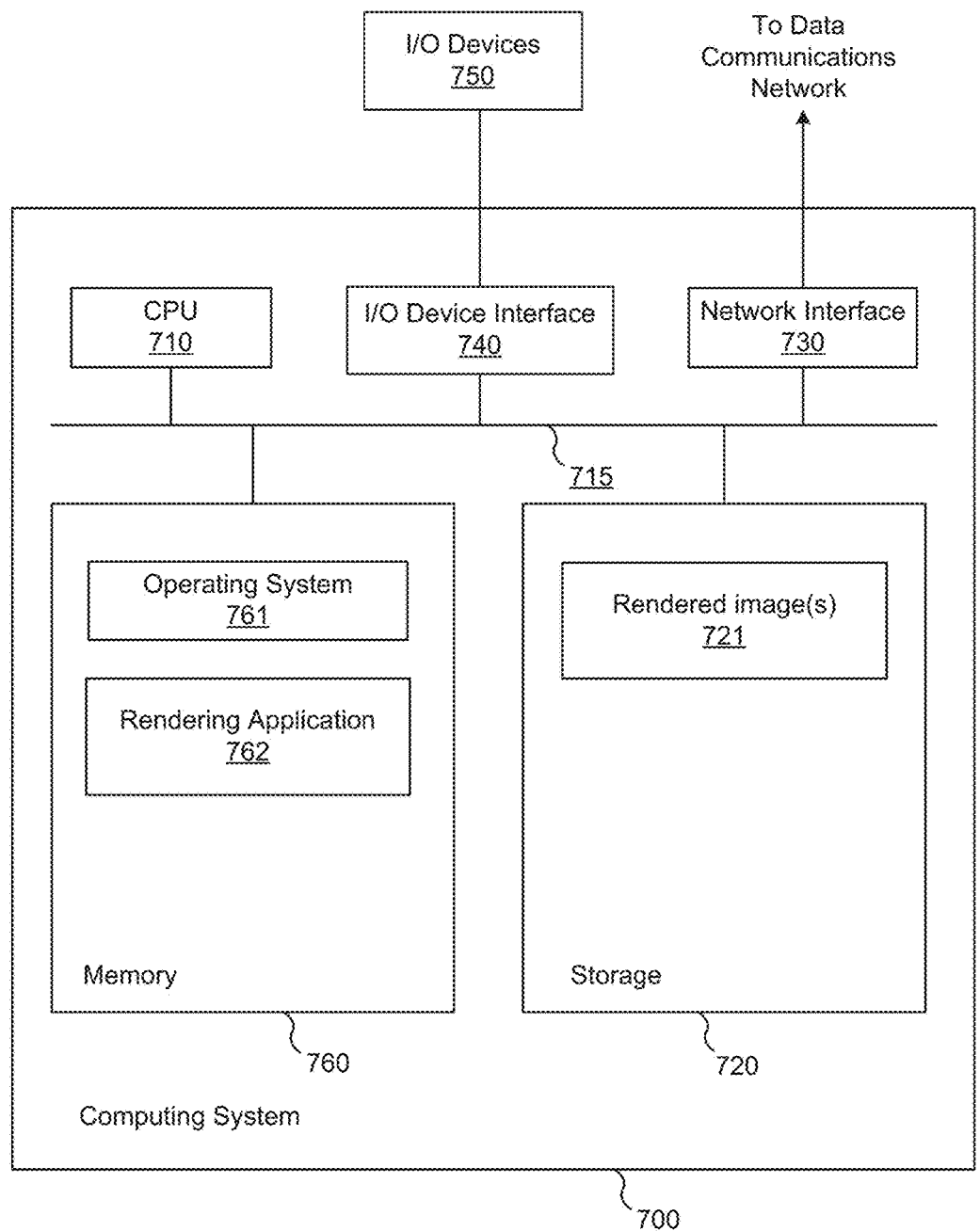
FIG. 7 illustrates a computer system in which an aspect of this disclosure may be implemented.

FIG. 7 illustrates a computer system 700 in which an aspect of this disclosure may be implemented. As shown, the system 700 includes, without limitation, a central processing unit (CPU) 710, a network interface 730, an interconnect 715, a memory 760 and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is representative of one or more of a single CPU, multiple CPUs, a single CPU having multiple processing cores, one or more graphics processing units (GPUs), and the like. And the memory 760 is generally included to be representative of a random access memory. The storage 720 may be a disk drive storage device. Although shown as a single unit, the storage 720 may be a combination of fixed or removable storage devices, such as fixed disc drives, flash drives, removable memory cards or optical storage, network attached storage (NAS), or a storage area-network (SAN). Further, system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 7 may be distributed across multiple computing systems connected by a data communications network.

As shown, the memory 760 includes an operating system 761 and a rendering application 762. Illustratively, the operating system 761 may include Linux® or Microsoft Windows®. The rendering application 762 is configured to render granular materials using a combination of explicit path tracing, proxy path tracing, shell tracing, and volumetric path tracing. In one aspect, the rendering application 762 may be configured to precompute grain scattering distribution functions; precompute a shell transport function database; shoot ray paths from a camera; determine whether to instantiate full geometry of a grain or a proxy geometry in lieu of the full geometry; perform explicit path tracing if the full grain geometry is instantiated; perform proxy path tracing for the grain if the proxy geometry is instantiated; if the GSDF albedo is above a threshold and a smallest precomputed STF shell fits in the granular material, switch to shell tracing in which the precomputed STF database is used to generate STFs by interpolating nearby STF entries, based on RTE parameters at the center of each shell or aggregated over a larger region; continue shell tracing if additional STF shells fit within the granular material; and switch to volumetric path tracing if the smallest shell no longer fits within the granular material, according to the method 600 discussed above with respect to FIG. 6.

Although discussed herein primarily with respect to combining explicit path tracing with accelerated path construction using proxy path tracing, shell tracing, and volumetric path tracing, it should be understood that one or more of these techniques may generally be used, depending on the particular granular assembly being rendered. For example, in the case of sand, relatively little light penetrates through the granular medium, so the GSDF which accounts for individual grains is more useful than shell tracing, which may even be omitted altogether. As another example, in the case of snow, and particularly if individual grains cannot be seen, the rendering application may rely more on shell tracing to obtain a smooth appearance of the material while potentially omitting explicit path tracing. In one aspect, the rendering application may automatically decide between which of the explicit path tracing, proxy path tracing, shell tracing, and volumetric path tracing to use, based on the circumstances during rendering.

Although discussed herein primarily with respect to granular materials, it should be understood that techniques disclosed herein may also be used to render other types of materials, such as volumes. For example techniques disclosed herein, and in particular the STFs, may be used to render skin, milk, or any other material that is a volume.

Advantageously, techniques disclosed herein permit rendering of heterogeneous and dynamic polydisperse granular media that can include random mixtures with multiple base materials and spatially varying grain concentrations, pack rates, and sizes. Use of proxy path tracing (for low-order scattering), shell tracing (for high-order scattering), and volumetric path tracing in techniques disclosed herein improves rendering speed over explicit path tracing, without introducing excessive error. The random-orientation and separability assumptions reduce the GSDF used in proxy path tracing to two independent 3D subspaces that can be efficiently tabulated. The rendering application precomputes a database of SFTs over an appearance space of optical RTE parameters so that shell tracing can be used in heterogeneous granular media based on the RTE parameters in an equivalent continuous liquid or volume that is discretized using a voxel grid. STFs do not need to be recomputed each time for different types of granular media. In addition, the rendering application switches to proxy path tracing, shell tracing, and volumetric path tracing based on predefined conditions. For example, to ensure that the reduced-dimensional GSDF does not impair visual quality, the rendering application only uses proxy path tracing for grains viewed from a distance or "through" other gains, with explicit path tracing being used for the first grain that the light path intersects if the first grain is not sufficiently far away from the camera.

The flowchart and block diagrams in the Figures illustrate the architecture, functionality, and operation of possible implementations of systems, methods and computer program products according to various aspect of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for rendering a granular medium, comprising:
   computing a plurality of shell transport functions (STFs) over an appearance space of optical parameters, each of the STFs aggregating a plurality of grain interactions into a single step;
   receiving geometry of a scene which includes the granular medium;
   determining a continuous volume approximation of the granular medium, the continuous volume approximation approximating the granular medium as a continuous medium which includes optical properties of the granular medium;
   tracing light paths from a camera into the scene; and
   for each traced light path of a plurality of the traced light paths that intersect the granular medium:
      successively selecting one or more of the STFs that are associated with shells which fit in the granular medium, each STF of the one or more of the STFs being selected based, at least in part, on a respective portion of the optical properties of the continuous volume approximation corresponding to optical properties associated with the STF, and
      constructing the traced light path using, at least in part, the selected STFs; and
   generating at least a rendered image of the scene based, at least in part, on the traced light paths.

2. The method of claim 1, wherein:
   the continuous volume approximation of the granular medium is discretized into a voxel grid; and
   the optical properties of the granular medium are determined in voxels of the voxel grid based, at least in part, on statistical properties of the granular medium.

3. The method of claim 1, wherein the determined optical properties include at least one of a phase function, an albedo, or an extinction coefficient.

4. The method of claim 1, wherein computing the plurality of STFs includes tabulating four dimensions including an angle of multi-scattering light transport, shell size, albedo, and phase function.

5. The method of claim 1, wherein the portion of the optical properties of the continuous volume approximation includes radiative transfer equation (RTE) parameters either at a center of the shell associated with the STF, averaged within a voxel grid, averaged within the shell associated with the STF, or averaged within an entire volume of the granular medium.

6. The method of claim 1, wherein each of the shells which fit in the granular medium are determined by interpolating one of the shells that fits within the granular medium with another of the precomputed shell that does not fit within the granular medium.

7. The method of claim 1, wherein sizes of the shells are limited to locally approximately homogeneous regions based, at least in part, on the optical properties of the continuous volume approximation or statistical properties of the granular medium.

8. The method of claim 1, further comprising:
computing a plurality of grain scattering distribution functions (GSDFs) that relate incident and outgoing radiance functions on corresponding grain bounding spheres; and
for each traced light path of the plurality of the traced light paths that intersect the granular medium:
prior to a smallest shell being able to fit within the granular medium, replacing one or more grains in the granular medium that the traced light path intersects with respective bounding spheres, and
constructing the traced light path through each bounding sphere of the respective bounding spheres using one of the computed GSDFs corresponding to the bounding sphere.

9. The method of claim 8, wherein each of the GSDFs includes a first term associated with uncollided flux for light that hits the corresponding grain bounding sphere but misses a grain inside and a second term associated with scattered transport for light that hits the grain inside the corresponding grain bounding sphere.

10. The method of claim 8, wherein each of the GSDFs is a function obtained using a random-orientation assumption that all light paths interacting with the corresponding grain bounding sphere experience a grain inside under a different random orientation and a separability assumption that decouples spatial and angular components of an incident light field.

11. The method of claim 8, further comprising, for each traced light path of the plurality of the traced light paths that intersect the granular medium:
instantiating a full geometry of a first grain that the traced light path intersects in the granular medium if either the first grain is less than a predefined distance from the camera or an error of a GSDF approximation for the first grain is more than a predefined threshold; and
constructing the traced light path through the full geometry of the first grain.

12. The method of claim 1, further comprising, constructing the traced light path using volumetric path tracing after a smallest available shell no longer fits within the granular medium.

13. A non-transitory computer-readable storage medium storing a program, which, when executed by a processor performs operations for rendering a granular medium, the operations comprising:
computing a plurality of shell transport functions (STFs) over an appearance space of optical parameters, each of the STFs aggregating a plurality of grain interactions into a single step;
receiving geometry of a scene which includes the granular medium;
determining a continuous volume approximation of the granular medium, the continuous volume approximation approximating the granular medium as a continuous medium which includes optical properties of the granular medium;
tracing light paths from a camera into the scene; and
for each traced light path of a plurality of the traced light paths that intersect the granular medium:
successively selecting one or more of the STFs that are associated with shells which fit in the granular medium, each STF of the one or more of the STFs being selected based, at least in part, on a respective portion of the optical properties of the continuous volume approximation corresponding to optical properties associated with the STF, and
constructing the traced light path using, at least in part, the selected STFs; and
generating at least a rendered image of the scene based, at least in part, on the traced light paths.

14. The computer-readable storage medium of claim 13, wherein:
the continuous volume approximation of the granular medium is discretized into a voxel grid; and
the optical properties of the granular medium are determined in voxels of the voxel grid based, at least in part, on statistical properties of the granular medium.

15. The computer-readable storage medium of claim 13, wherein the determined optical properties include at least one of a phase function, an albedo, or an extinction coefficient.

16. The computer-readable storage medium of claim 13, wherein computing the plurality of STFs includes tabulating four dimensions including an angle of multi-scattering light transport, shell size, albedo, and phase function.

17. The computer-readable storage medium of claim 13, wherein the portion of the optical properties of the continuous volume approximation includes radiative transfer equation (RTE) parameters either at a center of the shell associated with the STF, averaged within a voxel grid, averaged within the shell associated with the STF, or averaged within an entire volume of the granular medium.

18. The computer-readable storage medium of claim 13, the operations further comprising:
computing a plurality of grain scattering distribution functions (GSDFs) that relate incident and outgoing radiance functions on corresponding grain bounding spheres; and
for each traced light path of the plurality of the traced light paths that intersect the granular medium:
prior to a smallest shell being able to fit within the granular medium, replacing one or more grains in the granular medium that the traced light path intersects with respective bounding spheres, and
constructing the traced light path through each bounding sphere of the respective bounding spheres using one of the computed GSDFs corresponding to the bounding sphere.

19. The computer-readable storage medium of claim 18, wherein each of the GSDFs is a function obtained using a random-orientation assumption that all light paths interacting with the corresponding grain bounding sphere experience a grain inside under a different random orientation and a separability assumption that decouples spatial and angular components of an incident light field.

20. The computer-readable storage medium of claim 18, the operations further comprising, for each traced light path of the plurality of the traced light paths that intersect the granular medium:
   instantiating a full geometry of a first grain that the traced light path intersects in the granular medium if either the first grain is less than a predefined distance from the camera or an error of a GSDF approximation for the first grain is more than a predefined threshold; and
   constructing the traced light path through the full geometry of the first grain.

21. A system, comprising:
   a processor; and
   a memory, wherein the memory includes a program configured to perform operations for rendering a granular medium, the operations comprising:
      computing a plurality of shell transport functions (STFs) over an appearance space of optical parameters, each of the STFs aggregating a plurality of grain interactions into a single step,
      receiving geometry of a scene which includes the granular medium,
      determining a continuous volume approximation of the granular medium, the continuous volume approximation approximating the granular medium as a continuous medium which includes optical properties of the granular medium,
      tracing light paths from a camera into the scene, and
      for each traced light path of a plurality of the traced light paths that intersect the granular medium:
         successively selecting one or more of the STFs that are associated with shells which fit in the granular medium, each STF of the one or more of the STFs being selected based, at least in part, on a respective portion of the optical properties of the continuous volume approximation corresponding to optical properties associated with the STF; and
         constructing the traced light path using, at least in part, the selected STFs, and
      generating at least a rendered image of the scene based, at least in part, on the traced light paths.

* * * * *

UNITED STATES PATENT AND TRADEMARK OFFICE
CERTIFICATE OF CORRECTION

PATENT NO. : 10,169,910 B2
APPLICATION NO. : 15/427807
DATED : January 1, 2019
INVENTOR(S) : Jan Novak et al.

Page 1 of 2

It is certified that error appears in the above-identified patent and that said Letters Patent is hereby corrected as shown below:

In the Specification

In Column 10, Line 65, delete "$p_g^{\vec{\omega}(\vec{\omega}_i|\beta_o)}$" and insert -- $p_g^{\vec{\omega}}(\vec{\omega}_i|\beta_o)$ --, therefor.

In Column 11, Line 66, delete ")$R^2$( and )$R^3$(" and insert -- $\langle R^2 \rangle$ and $\langle R^3 \rangle$ --, therefor.

In Column 12, Lines 37-41, delete "$f_s(x_c,\vec{\omega}_c,x_s,\vec{\omega}_s,\alpha,g)=\alpha_s^0(r)\delta(\vec{\omega}_c-\vec{\omega}_s)+\alpha_s^1(\alpha,g,r)p_2^1(x_s,\vec{\omega}_s|g,r)+\alpha_s^m(\alpha,g,r)p_s^m(x_s,\vec{\omega}_s|\alpha,g,r),$" and insert -- $f_s(x_c,\vec{\omega}_c,x_s,\vec{\omega}_s,\alpha,g)=\alpha_s^0(r)\delta(\vec{\omega}_c-\vec{\omega}_s)+\alpha_s^1(\alpha,g,r)\,p_s^1(x_s,\vec{\omega}_s|g,r)+\alpha_s^m(\alpha,g,r)p_s^m(x_s,\vec{\omega}_s|\alpha,g,r),$ --, therefor.

In Column 12, Line 61, delete "a" and insert -- α --, therefor.

In Column 15, Line 45, delete "$\vec{\omega}_i \cdot \vec{f}_o).$" and insert -- $\vec{\omega}_i \cdot \vec{\omega}_o).$ --, therefor.

In Column 15, Line 61, delete "$p_g^{\vec{\omega}(\vec{\omega}_i|\beta_o)}$" and insert -- $p_g^{\vec{\omega}}(\vec{\omega}_i|\beta_o)$ --, therefor.

In Column 17, Line 5, delete "$\vec{\omega}$" and insert -- $\vec{\omega}_s$ --, therefor.

Signed and Sealed this
Nineteenth Day of March, 2019

Andrei Iancu
*Director of the United States Patent and Trademark Office*

CERTIFICATE OF CORRECTION (continued)
U.S. Pat. No. 10,169,910 B2

In Column 17, Lines 48-54, delete "volume is roughly proportional to log $\left(\frac{1}{1-\alpha}\right)$" and insert -- volume is roughly proportional to $\log\left(\frac{1}{1-\alpha}\right)$ --, therefor.

In the Claims

In Column 21, Line 15, in Claim 6, delete "another of the" and insert -- another --, therefor.